United States Patent Office 3,082,493
Patented Mar. 26, 1963

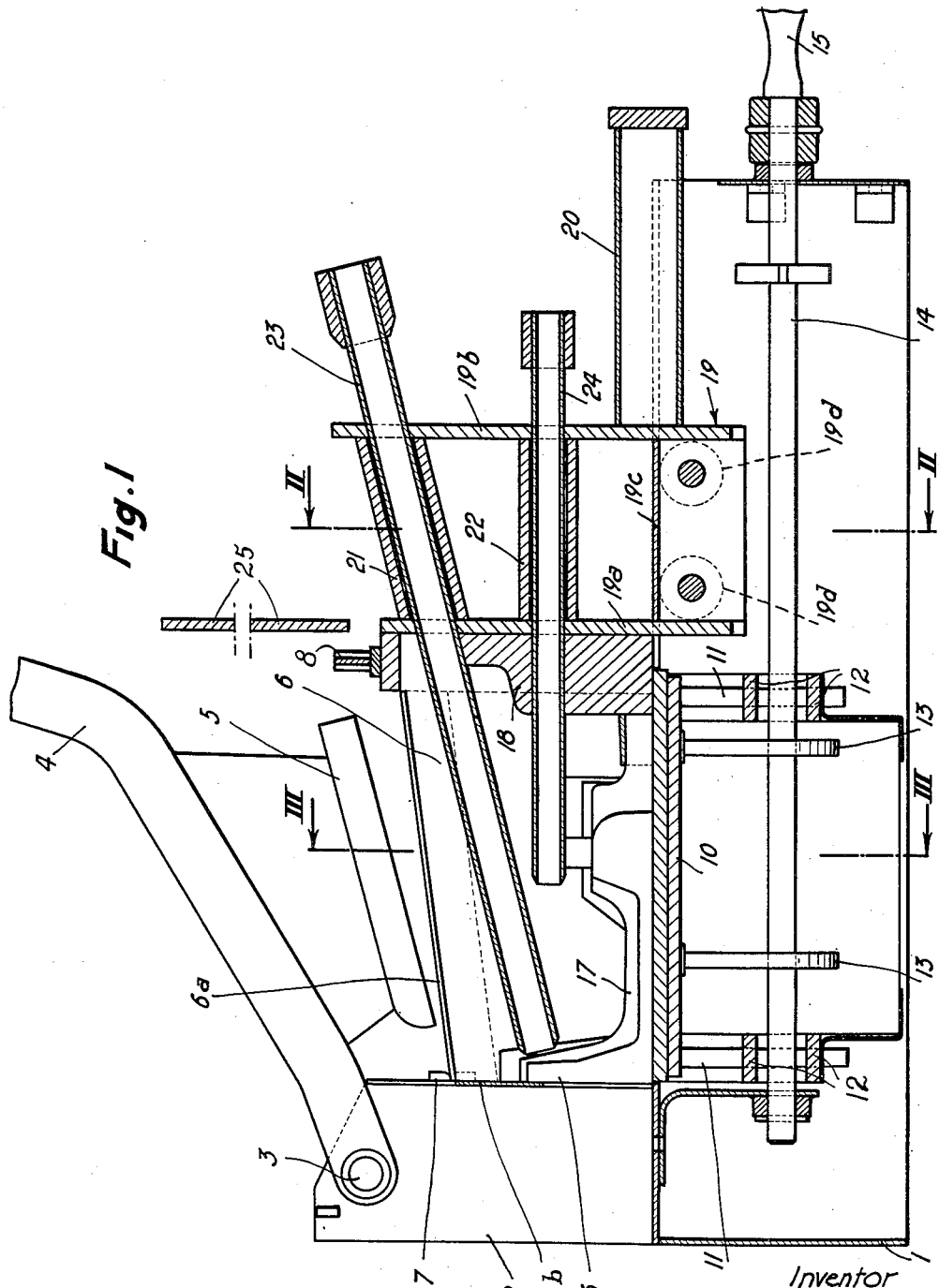

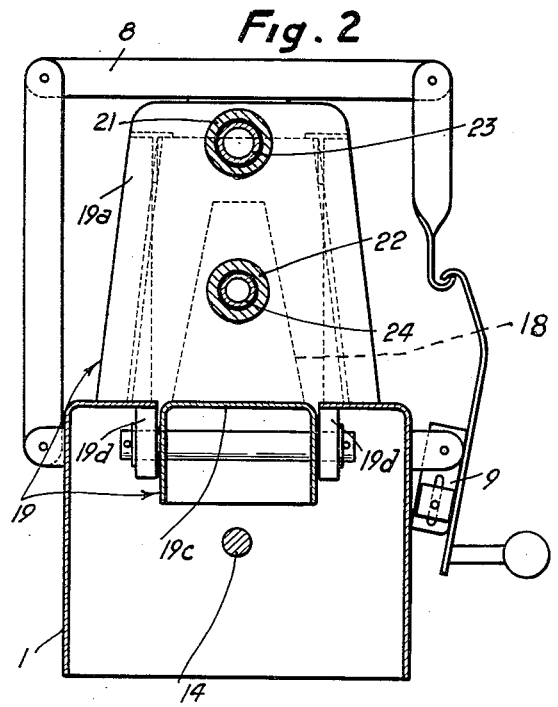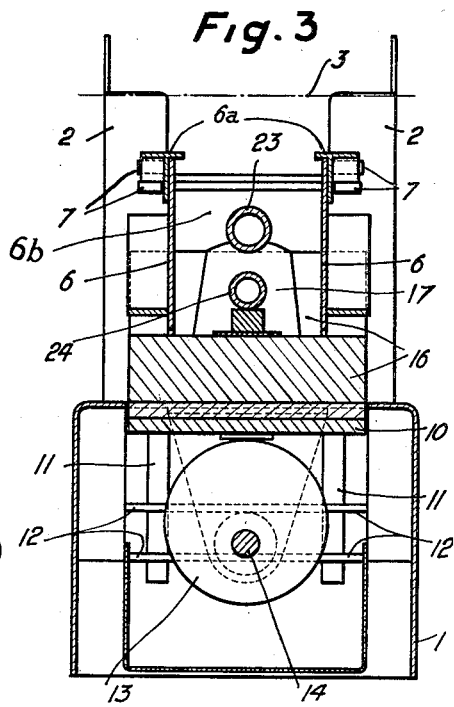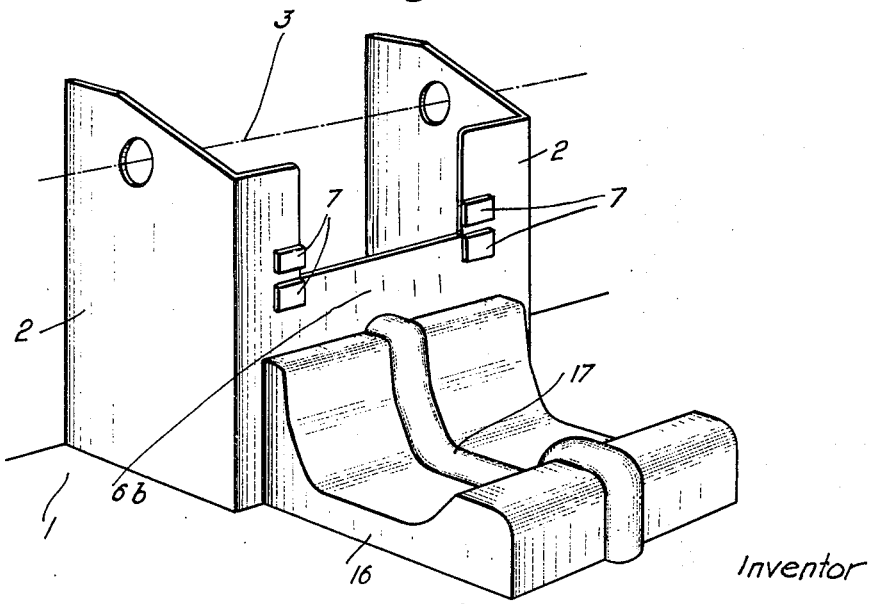

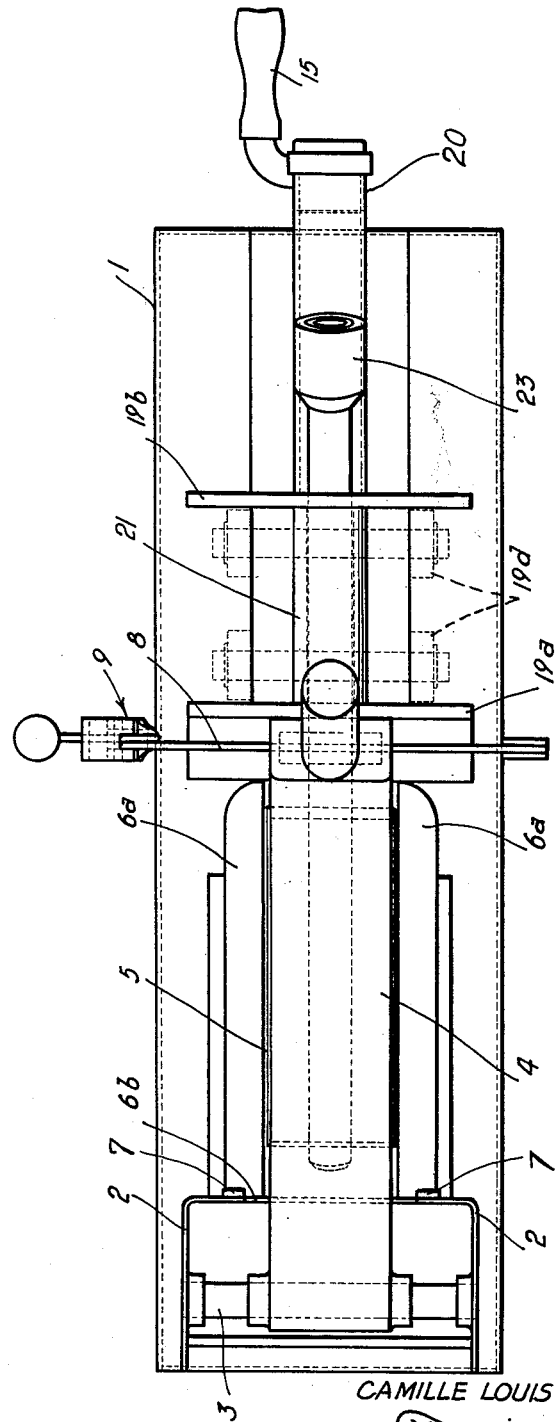

3,082,493
APPARATUS FOR THE PRODUCTION OF MOULDS, IN PARTICULAR FOR ALUMINOTHERMAL WELDING
Camille Louis Jacques Boutet, 68 Rue Ordener, Paris, France
Filed Aug. 8, 1960, Ser. No. 48,045
Claims priority, application France Aug. 20, 1959
8 Claims. (Cl. 22—9)

The present invention relates to an apparatus for producing moulds (especially those for aluminothermal welding) and more particularly for producing the upper elements of moulds in three parts adapted for uniting by welding the ends of rails, in particular moulds of the type comprising, on the one hand, a base plate adapted to be applied under pressure against the lower face of the flanges of the two rail ends to be welded and, on the other hand, two upper parts, advantageously composed of sand, symmetrically disposed, identical to one another and adapted to come into close contact with said base plate, to be applied against one another without clearance and to be effectively clamped against said rail ends. Apart from the base plate, it is therefore sufficient to construct a single type of the upper part (since the two upper parts of the mould are identical).

The apparatus according to the invention, which permits producing on the spot under simple and economical conditions the upper parts of the mould in question, is characterised in that it comprises a carcass or base in the form of an overturned case adapted to receive a rail core-pattern having the outer shape of a semi-rail, to carry a mould chassis and to guide the moulding core of the half part of a pouring basin, said base also supporting packing means for packing the sand in the chassis around said core-patterns.

In a preferred embodiment, the apparatus according to the invention is characterised by the following features and combinations thereof:

The packing means comprise an operating lever which is pivoted to a support rigid with the base and carries a packing block;

The lever support carries positioning abutment means for a part of the mould chassis, which part abuts against said support;

An articulated strap and an elastic locking means permit the blocking of the mould chassis on the base;

The rail core-pattern is supported by a plate which is movable relative to the base and whose position in height is controlled by cams;

The cams controlling the moving plate are keyed on a control shaft which is journalled in said base and can be actuated from the exterior;

The core of a half part of the pouring basin is supported by a carriage which is longitudinally slidable along the base;

The carriage supporting the above mentioned core is provided with tubular guides for the passage therethrough of solid or tubular rods adapted to form in the mould the runner or runners and (or) the riser or risers.

Further features and advantages of the invention will be apparent from the ensuing description of one embodiment of the apparatus which is given merely by way of example and shown diagrammatically in the accompanying drawing, in which:

FIG. 1 is a vertical longitudinal sectional view of the apparatus;

FIG 2 is a cross-sectional view, on an enlarged scale, taken along line II—II of FIG. 1, and FIG. 3 is a view similar to FIG. 2, taken along line III—III of FIG. 1.

FIG. 4 is a plane view of the apparatus;

FIG. 5 is a partial perspective view of the upper rear part of the apparatus.

As can be seen from the drawing, the mould is formed, in the mould chassis, in the recumbent position, the base of the mould to be obtained being located on the left side of FIG. 1. The apparatus comprises a base 1, for example of sheet metal, which forms a casing having, in section, the shape of an overturned U with a flat base.

Located at the rear part (left side of FIG. 1) of the base 1 are support means consisting of two vertical angle-irons 2 carrying the pivot pin 3 of a packing or tamping lever 4. The latter carries a packing block 5 of such shape as to ensure a good packing of the sand contained in the mould chassis which is composed of two lateral upwardly extending walls 6 forming a detachable mould chassis member, of sheet metal, reinforced by T-section elements 6a and whose rear edge (left side of FIG. 1) is maintained in contact with said support means and blocked against the upper face of the base by an arrangement of abutments 7 carried by the two angle-irons 2 forming an upwards extending stationary end wall 6b.

The other part (right side of FIG. 1) of the chassis 6 is blocked against the upper face of the base by means of an articulated strap 8 which is tightened by spring locking means or latch 9.

In the region where the base receives the chassis 6, the upper face of the base has an opening adapted to receive a horizontal plate 10 which is vertically movable and provided with guide columns 11 vertically slidable in guides 12 rigid with the base 1.

The position in height of the plate 10 is controlled by cams 13 keyed on a control shaft 14 which is journalled in the base, out of which it extends forwardly (toward the right in FIG. 1), and carries a control handle 15.

The movable plate 10 carries the rail core-pattern 16, which is, in the presently described embodiment, a piece of rail half of which has been cut away on the plane of symmetry and which carries, in the region where the pouring chamber of the mould is to be formed, a boss of aluminum 17.

In order to form the pouring-basin which will be located at the upper part of the mould, use is made of a core-pattern 18 which has the shape of the half part of said pouring basin and is fixed to a carriage 19 longitudinally guided on the base 1. This carriage consists of two trapezoidal side members 19a and 19b which are interconnected by a spacer member 19c and rest on the upper face of the base 1 which is apertured in this region. The carriage is guided by the parts of the side members, which slide on the top of the base 1, and by four rollers 19d which bear against the lower face of the upper wall of the base. The carriage 19 comprises an anvil-ram 20 which may be struck by a hammer so as to force the basin core into the sand contained in the chassis.

The carriage 19 also comprises two tubular guides 21 and 22 which act as spacer members for the side members 19a and 19b and permit driving into the sand of the mould two rods 23 and 24 which are preferably tubular and are adapted to form the runner (leading to the head of the rail) and the riser (leading to the flange of the rail).

The apparatus just described is used in the following manner:

Assuming the carriage 19 with the core-pattern 18 is withdrawn (towards the right in FIG. 1) and is devoid of the rods 23 and 24, the handle 15 is rotated so as to raise the plate 10 carrying the pattern 16 and to bring the latter to its upper position (position of use shown in the drawing).

The detachable chassis member 6 is now placed on the base 1 and held thereon against the angle-irons 2 and the abutments 7 by the strap 8 and the locking means 9.

On the right side, the chassis is temporarily closed by a detachable sheet metal closing plate (shown in a withdrawn position in FIG. 1) so that the chassis is in the form of a box open at its upper part and having a bottom constituted by a part of the upper face of the base 1 and of the plate 10 and by the unit comprising the rail core-pattern 16 and the boss 17.

The moulding sand is poured into this box (in one or several goes) and packed and tamped therein by actuation of the packing lever 4 whose packing block 5 effects the packing.

When the chassis is filled with packed sand, the detachable closing plate 25 is removed and the carriage 19 is pushed towards the left (by striking the anvil-ram 20 with a hammer) so as to force the basin core 18 into the sand until the side member 19a of the carriage comes into contact with the chassis walls 6. In the course of this operation the mould sand is packed solid.

In order to form in the mould the runner and the riser, there are engaged in the guides 21 and 22 of the carriage 19, the tubular rods 23 and 24 which are driven into the packed sand until they occupy the positions shown in FIG. 1.

When the sand is sufficiently agglomerated, the rods 23 and 24 are withdrawn, the carriage pushed towards the right, the assembly 10—16—17 lowered (by actuating the handle 15) and the strap 8 released.

The mould part formed in the apparatus can now be removed and used, if desired after a period of time to ensure complete setting of the sand.

It must be understood that the embodiment described hereinbefore and shown in the drawing has been given merely by way of example and any modification of detail can be effected therein without departing from the scope of the invention.

What I claim is:

1. Apparatus for producing moulds of refractory material comprising: a base having a flat face for supporting a core adapted to form the cavity of the mould; upwards extending support means forming one piece with said base and adapted to form an upwards extending stationary end wall of a mould chassis; two removable lateral upwards extending walls supported by said base, in abutment against the said support means and forming a detachable mould chassis member; a carriage slidable on the base, in a direction perpendicular to said stationary end wall and forming a removable upwards extending wall opposite the said stationary end wall; and packing means pivoted to said support means for packing refractory material in the formation cavity of the mould chassis defined by the base, the stationary end wall, the carriage forming the movable end wall and the two lateral detachable walls.

2. Apparatus for producing moulds as claimed in claim 1, further comprising slot forming transverse abutment and positioning means integral with the support means, for holding the detachable mould chassis in position against the said support means.

3. Apparatus for producing moulds as claimed in claim 1, further comprising clamping means located above the base and connected to the latter for temporarily clamping the detachable mould chassis member on the said base.

4. Apparatus for producing moulds as claimed in claim 3, wherein the clamping means consist of an articulated bridge piece having one end pivoted to the base and provided, at the other end, with elastic locking means connectible to the base.

5. Apparatus for producing moulds as claimed in claim 1, wherein the flat face of the base comprises a rectangular opening flush with the support forming closing wall, and wherein are further provided a movable plate able to be located in said opening for closing the latter and control means for controlling the position of said plate with respect to said face.

6. Apparatus for producing moulds as claimed in claim 5, wherein the plate control means consist of a rotary shaft supported by the base and actuable from the exterior of said base, and cams keyed on said shaft and cooperating with said plate so as to shift it in a direction perpendicular to said opening.

7. Apparatus for producing moulds as claimed in claim 1, further comprising a movable moulding core having the form of at least one part of a pouring basin, and securable to the slidable carriage, in order to form, in the mould material, the said pouring basin part, when said carriage is pushed towards the stationary end wall.

8. Apparatus for producing moulds as claimed in claim 1, further comprising longitudinal tubular guides carried by the slidable carriage and removable sliding shaping means passing through said guides for penetrating into the mould material in order to form therein at least one duct of the class of a pouring hole and a riser.

References Cited in the file of this patent

UNITED STATES PATENTS

| | | |
|---|---|---|
| 1,659,837 | Ryan | Feb. 21, 1928 |
| 1,883,542 | Campbell | Oct. 18, 1932 |